United States Patent [19]

Grant et al.

[11] Patent Number: 4,496,690

[45] Date of Patent: Jan. 29, 1985

[54] ALLOYS OF STYRENIC RESINS AND POLYAMIDES

[75] Inventors: Thomas S. Grant; Charles L. Myers, both of Vienna, W. Va.

[73] Assignee: Borg-Warner Chemicals, Inc., Parkersburg, W. Va.

[21] Appl. No.: 500,719

[22] Filed: Jun. 3, 1983

Related U.S. Application Data

[63] Continuation of Ser. No. 326,149, Nov. 30, 1981, abandoned.

[51] Int. Cl.$^3$ ............................................ C08L 77/00
[52] U.S. Cl. ..................................................... 525/66
[58] Field of Search ........................................... 525/66

[56] References Cited

U.S. PATENT DOCUMENTS 4,221,879  9/1980  Humme et al. ...................... 525/66
4,287,315  9/1981  Moyer et al. ....................... 525/183

Primary Examiner—Melvin I. Marquis
Assistant Examiner—A. L. Carrillo
Attorney, Agent, or Firm—R. J. Schlott

[57] ABSTRACT

Styrenic resins having incorporated therein from 0.5 to 15 pbw of a copolymerizable, ethlenically unsaturated carbonamide such as acrylamide form alloys with polyamides which exhibit improved compatibility, higher heat distortion temperatures and improved Izod impact values over the range of from 5 to 95 wt. % polyamide and 95 to 5 wt. % modified styrenic resin. The alloys may further include unmodified styrenic resins, as well as conventional stabilizers, fillers and the like.

7 Claims, No Drawings

ALLOYS OF STYRENIC RESINS AND POLYAMIDES

CROSS-REFERENCE TO RELATED APPLICATIONS

This application is a continuation of U.S. patent application Ser. No. 326,149, filed Nov. 30, 1981, now abandoned.

BACKGROUND OF THE INVENTION

The present invention relates to alloys of synthetic resins and more particularly to alloys of modified styrenic resins with polyamides and to a method for the preparation of alloys of styrenic resins with polyamides.

Aliphatic and aromatic polyamides, widely termed nylon resins, are generally incompatible or at best are only poorly compatible with hydrocarbon polymers such as polystyrene and the copolymers and graft polymers of styrene with acrylic esters, acrylonitriles and the like. Blends of certain nylon resins with some styrenic resins are known in the art, such as for example the blends of epsilon caprolactam polymers with acrylonitrile-styrene-butadiene (ABS) graft polymers disclosed in U.S. Pat. No. 3,134,746. Even though these known prior art blends exhibit many useful properties, lack of good compatibility between the polyamide and ABS prevents the realization of the full potential properties of such resin blends.

As used herein, the term compatibility refers to the miscibility of two polymers. A truly compatible mixture will form an homogeneous composition which does not separate into its component phases, while incompatible polymers combine to form heterogeneous mixtures having separate phases comprising each of the components. Extrusion or injection molding of incompatible mixtures results in layered extrudates and in molded articles comprising layers of the component polymers. For truly incompatible mixtures, the layers adhere poorly and are easily separated. Where the components have marginal compatibility, the resulting layers will adhere and have a somewhat laminate character with good impact resistance and physical properties in the flow direction. As with most laminar structures, however, properties in the transverse direction are poor, and when the parts are twisted or flexed, the layers tend to delaminate and break.

Methods for preventing phase separation and delamination in mixtures of dissimilar resins have included the forming of crosslinks between the two components by peroxide or radiation techniques, thus physically tying the components together by way of covalent bonds, and the including of a third polymeric material in the form of a block or graft polymer having segments separately compatible or miscible with each of the components which thus acts as a macromolecular surfactant to increase the compatibility of otherwise nonmiscible polymers, as taught in U.S. Pat. No. 3,485,777.

More recently, in U.S. Pat. No. 3,668,274, there was disclosed a method for preparing alloys of nylon resins and a multistage modifier resin consisting of a graft copolymer having an amine-reactive moiety copolymerized in graft phase. The amine-reactive moiety, such as a copolymerizable carboxylic acid, reacts with the amine end-groups of the nylon component to form covalent bonds with the result that the nylon and graft copolymer components are chemically bound together. These alloys, in effect macro graft copolymers having polyamide chains bound to the side chains of the multistage modifier resin, do not exhibit phase separation during processing.

The methods heretofore employed for combining styrenic resins and polyamides have enjoyed some success. However, these processes which rely upon the forming of covalent bonds between polymer chains result in substantial increases in molecular weight in the final composition and have the potential for producing cross-linked resins. As will be understood by those skilled in the art, increases in molecular weight and cross-linking can greatly affect processability by lowering melt flow and otherwise effecting an undesirable decrease in tractability of the composition. Where the carboxylic acid-modified styrenic resin component is employed as an impact modifier for polyamides and forms only a minor portion of the final composition, as taught in U.S. Pat. No. 3,485,777, the level of cross-link formation is generally low and the tractability of the compositions is usually not much affected. However, where the styrenic resin components forms a substantial or major proportion of the composition, it will be apparent that cross-link formation and molecular weight increases by way of covalent bond formation can present a major problem by substantially decreasing the processability of the composition and possibly rendering it intractable. A method for providing alloys of styrenic resins and polyamides which reduces phase separation and delamination without significant covalent bond formation and cross-linking would thus lead to improved polyamide-styrenic resin compositions without sacrificing processability and tractability.

SUMMARY OF THE INVENTION

This invention relates to alloys of styrenic polymers and polyamides. More particularly, the invention relates to alloys of modified styrenic resins and nylons, the modification being accomplished by including in the styrenic resin a minor amount of a copolymerizable, ethylenically-unsaturated carbonamide. Blends of the modified styrenic resins with nylons behave as alloys, exhibiting a reduced tendency to delaminate during melt processing. The alloys have surprisingly high impact properties as well as tensile strength and high load heat distortion properties better than those of mere blends of nylon with conventional styrenic resins.

DETAILED DESCRIPTION

The polyamides useful for the purposes of this invention are the conventional injection-moldable polyamide resins known widely as nylon resins including the aliphatic polylactams such as polycaprolactam (nylon 6), and those polyamides formed from an aliphatic diamine and an aliphatic dicarboxylic acid such as for example polyhexamethylene adipamide (nylon 6,6), polyhexamethylene sebacamide (nylon 6,10) and the like.

The styrenic polymers which may be usefully modified for the purposes of this invention are polymers and copolymers of styrene and include both rigid resins and those generally referred to as high-impact styrenic resins such as the resins prepared by the graft polymerization of mixtures of styrene and optionally one or more additional copolymerizable vinyl monomers in the presence of a rubbery polymeric substrate, as well as resins prepared by blending a rigid matrix polymer with a grafted rubbery substrate. Comonomers which may be employed in mixtures with styrene for use in the preparation of rigid styrene copolymers as well as for use as grafting monomers include monomers selected from the group alphamethylstyrene, halostyrenes, vinyl alkylbenzenes such as vinyl toluene, vinylxylene, butylstyrene and the like, acrylonitrile, methacrylonitrile, the lower alkyl esters of methacrylic acid and mixtures thereof. In the high-impact styrenic resins, the rubbery polymeric substrate will comprise from 5 to 80%, preferably from 5 to 50% of the total weight of the graft polymer and will include rubbery polymers selected from the group consisting of polybutadiene, polyisoprene, rubbery styrene-diene copolymers containing up to 50 wt.% styrene, acrylic rubber nitrile rubber and olefin rubbers such as EPDM and EPR.

Specific examples of graft polymers which may be usefully modified for the purposes of this invention are the acrylonitrile-butadiene-styrene graft polymer resins (ABS), methylmethacrylate-butadiene-acrylonitrile-styrene (MABS) resins and the like. Specific examples of styrene resins which may be usefully modified for the purpose of this invention include polystyrene and copolymers of styrene such as styrene-acrylonitrile (SAN) copolymers, styrene-methacrylate ester copolymers, and mixtures thereof, as well as the analogous copolymer resins wherein a portion of the styrene monomer component is replaced with alpha-methylstyrene.

For use in preparing the alloys of this invention, the styrenic resins are modified by the including of a copolymerizable, ethylenically- $\alpha,\beta$ unsaturated carbonamide with the styrene monomer mixture. Representative of the unsaturated carbonamides are acrylamide, methacrylamide and the like, as well as mixtures thereof. The most effective unsaturated carbonamides are those which are readily copolymerized with the monomer mixture, and more particularly are those wherein the ethylenic unsaturation is conjugated with the carboxyl group i.e., the unsaturated carbonamides. Nonconjugated unsaturated amides such as $\Delta$-4 tetrahydrophthalamide may also be employed, however these are not preferred due to the difficulty with which they are copolymerized in the preparation of styrenic polymers.

The modifier monomer will be employed at very low levels in the polymerization of the styrenic resin components, and normally will comprise from 0.5 to 15 parts by weight (pbw) and more preferably from 0.5 to about 10 pbw per hundred parts by weight of modified styrenic resin. The level employed will depend in part upon the particular unsaturated carbonamide employed, and the optimum level for most purposes will lie in the range from about 0.5 to about 10 pbw for most applications. At levels below about 0.5 pbw, little if any improvement will be observed, while at levels much above about 10 pwb for most of the unsaturated carbonamides the overall properties of the ABS component begin to be affected detrimentally. Carbonamide monomers which copolymerize poorly, such as for example $\Delta$-4 tetrahydrophthalamide, will be employed at much higher levels in the polymerization step to ensure that a minimum effective amount will become incorporatd in the final resin, and for that reason such modifiers are not preferred.

Any of the conventional copolymerization processes may be employed to prepare the modified styrenic polymers useful for the purposes of this invention including bulk, bulk-suspension, solution, suspension and emulsion processes.

The modified styrenic polymers, when melt-mixed with nylons, form alloys rather than mere blends. The alloys exhibit unexpectedly great improvement in high load heat distortion temperatures and impact properties as compared with equivalent blends of unmodified styrenic polymers with nylons.

The alloys are formed by melt-blending the modified styrenic polymers with the polyamide using any of the conventional melt processing techniques such as for example Banbury mixing, milling and extrusion. Most conveniently, the alloys will be formed by first mixing the dried resins in powder, flake or similar dry solid form, then melt processing the resulting dry blend. Equally useful for most purposes will be the fluxing of the resins in a Banbury mixer to provide an homogeneous mass which then may be sheeted-out on a mill and chopped to form a particulate material for extrusion or injection molding. Such mixing processes are conventionally employed in the plastics converting art and various modifications will be apparent to these skilled in the art.

The alloys may further include such additives as thermal, oxidation and light stabilizers, lubricants, pigments, dyes, fillers, flame retardants, glass and mineral fibers, reinforcing agents and plasticizers. Such additives are added in accord with techniques well known in the art in proportions which are commonly employed.

The practice of the invention will be made more readily apparent by consideration of the following examples, which are provided by way of illustration and not limitation.

EXAMPLE 1

Preparation of an ABS Resin—Control

A polymerization reactor was charged with an emulsion latex containing 25 parts by weight (pbw) polybutadiene, 200 pbw water, 0.5 pbw dextrose, 0.25 pbw t-dodecylmercaptan and 1.4 pbw surfactant. The latex was stirred and heated to 140° F., then the following three solutions were added simultaneously over a 90 minute period—(1) a monomer mixture of 48 pbw styrene and 27 pbw acrylonitrile, (2) 0.25 pbw cumene hydroperoxide, and (3) 0.55 pbw tetrasodium pyrophosphate, 0.015 pbw ferrous sulfate heptahydrate, and 6.0 pbw demineralized water. After the solutions were added, stirring at 140° F. was continued for an additional 120 minutes to complete the graft polymerization reaction.

After adding 2 pbw thermal stabilizer the emulsion was coagulated with calcium chloride and the graft resin was collected by filtration and dried.

EXAMPLES 2-5

Preparation of Modified ABS Resins

Graft ABS resins modified by the including of acrylamide monomer were prepared substantially by the procedure of Example 1. The acrylamide monomer was added as a separate stream simultaneously with the grafting monomers. The monomer formulations for the modified resins of Example 2-5 are summarized in Table 1.

EXAMPLE 6

Preparation of Modified Styrene-Acrylonitrile Copolymer

An acrylamide modified styrene-acrylonitrile copolymer was prepared substantially by the procedures used in Examples 1-5 with the omission of the polybutadiene from the initial reactor charge. The reaction temperature was 160° F.

A control resin, Example 7, was similarly prepared by omitting the acrylamide monomer. The modified copolymer and control resin formulations in parts by weight are set out in Table 1.

TABLE I
Compositions of Modified Styrenic Resins and Control Resins

| Component | 1 | 2 | 3 | 4 | 5 | 6 | 7 |
|---|---|---|---|---|---|---|---|
| Polybutadiene | 25 | 25 | 25 | 25 | 25 | 0 | 0 |
| Styrene | 48 | 46 | 45 | 44 | 42 | 60 | 70 |
| Acrylonitrile | 27 | 28 | 27 | 26 | 23 | 30 | 30 |
| Acrylamide | 0 | 1 | 3 | 5 | 10 | 10 | 0 |

EXAMPLES 8-12

Alloys of Modified ABS And Nylon 6

In the following examples, alloys of the modified ABS resins of Examples 1-5 with Nylon 6 were prepared by compounding in a Werner-Pfleiderer 28 mm. twin screw extruder using barrel temperatures in the range of 360°-510° F. and extruding the alloy through a strand die at a temperature in the range of 485°-510° F. The alloy extrudate was diced, then molded on a Van Dorn reciprocating screw injection molding machine at a stock temperature in the range of 525°-540° F., using an ASTM family mold at a temperature of 180° F. to form test plaques and bars. The blend formulations and the physical properties of these blends are summarized in Table II. Control blends A-D are included for comparison purposes.

TABLE II
Alloys of Nylon 6 & Modified ABS Resins

| Example No: | 8 | 9 | 10 | 11 | 12 | A (Control) | B (Control) | C (Control) | D (Control) |
|---|---|---|---|---|---|---|---|---|---|
| Formulations: | | | | | | | | | |
| Modified ABS (1) | | | | | | | | | |
| Ex. 5 (pbw) | 95 | 75 | 50 | 25 | 5 | | | | |
| Ex. 1 (pbw) | | | | | | 100 | 75 | 50 | 0 |
| Nylon 6 (pbw) | 5 | 25 | 50 | 75 | 95 | 0 | 25 | 50 | 100 |
| % Acrylamide (2) | 9.5 | 7.5 | 5.0 | 2.5 | 0.5 | 0 | 0 | 0 | 0 |
| Properties: | | | | | | | | | |
| Izod Impact (3) | | | | | | | | | |
| Dry | 4.7 | 11.5 | 4.0 | 2.9 | 1.3 | 5.1 | 3.1 | 1.4 | 1.4 |
| Tempered | 7.0 | 11.8 | 4.4 | 3.0 | 1.8 | — | — | — | 1.0 |
| HDT (°F.) (4) | 217 | 218 | 196 | 183 | 178 | 202 | 194 | 192 | (119) |

Notes:
(1) Modified ABS of Examples 1 and 5; see Table 1.
(2) Wt. % acrylamide in final composition
(3) Izod Impact at R.T., ft. lbs./in. notch, ⅛" × ⅛" bars, Dry = as molded specimens; Tempered = conditioned at 50% rel. humidity.
(4) HDT = heat distortion temperature, 264 psi, 10 mil deflection, ⅛" × ⅛" bars, annealed. value ( ) is for unannealed sample.

As shown by the data presented in Table II, compositions comprising from 5 to 95 wt.% nylon 6 and, correspondingly from 95 to 5 wt.% acrylamide-modified ABS resin exhibit unexpected changes in one or more physical properties. Although there is little effect on impact properties at either extreme, the HDT values are markedly increased (compare Example 8 with control A and Example 12 with control D). In the intermediate range, however, there is substantial improvement in impact properties (compare Example 9 with control B and Example 10 with control C).

TABLE III
Alloys of Nylon 6 & Modified ABS Resins

| Example No.: | 13 | 14 | 15 | 16 | 17 | 18 | B (Control) | C (Control) |
|---|---|---|---|---|---|---|---|---|
| Formulations: | | | | | | | | |
| Modified ABS (1) | | | | | | | | |
| Ex. 1 (pbw) | — | — | — | — | — | — | 75 | 50 |
| Ex. 2 (pbw) | 75 | — | — | 50 | — | — | — | — |
| Ex. 3 (pbw) | — | 75 | — | — | 50 | — | — | — |
| Ex. 4 (pbw) | — | — | 75 | — | — | 50 | — | — |
| Nylon 6 (pbw) | 25 | 25 | 25 | 50 | 50 | 50 | 25 | 50 |
| % Acrylamide (2) | 0.75 | 2.25 | 3.75 | 0.5 | 1.5 | 2.5 | 0 | 0 |
| Properties: | | | | | | | | |
| Izod Impact (3) | 11.8 | 14.1 | 14.4 | 2.7 | 3.0 | 2.1 | | |
| | (5.5) | (11.2) | (13.5) | (2.3) | (2.9) | (2.8) | (3.1) | (1.4) |
| HDT (°F.) (3) | 216 | 219 | 212 | — | 212 | 208 | 194 | 192 |
| Yield (KPSi) | 6.59 | 6.40 | 6.20 | 6.39 | 5.96 | 6.02 | 5.05 | 4.90 |
| Elong. (%) | 105 | 118 | 107 | 352 | 224 | 352 | 282 | 382 |

TABLE III-continued

| | Alloys of Nylon 6 & Modified ABS Resins | | | | | | Controls | |
|---|---|---|---|---|---|---|---|---|
| Example No.: | 13 | 14 | 15 | 16 | 17 | 18 | B | C |
| T. Mod. (KPSi) | 284 | 285 | 289 | 283 | 263 | 262 | 233 | 222 |

Notes:
(1) Modified ABS of Examples 1-4; see Table I.
(2) Wt. % acrylamide in total composition.
(3) Izod Impact values for tempered samples; values in ( ) for as molded samples. HDT values for annealed specimens; see notes 3 and 4, Table II.

The data presented in Table III demonstrate the variations in properties with acrylamide content for fixed ratios of modified ABS and nylon 6. In Examples 13, 14 and 15, and in control B, the compositions comprise 75 wt.% modified ABS and 25 wt.% nylon 6. The acrylamide content of the total composition was varied from 0.75 to 3.75 wt.% by employing acrylamide-modified ABS resins with appropriate acrylamide contents. It will be apparent from a comparison of the physical properties of Examples 13-15 with those of Control B that substantial improvement impact properties and HDT values occurs at levels as low as 0.75 wt.% acrylamide, and that only modest changes occur with further increases in acrylamide content.

Resin compositions comprising 50 wt.% ABS and 50 wt.% nylon 6, shown in Table III as Examples 16-18 and Control C, were also prepared and tested. Although these compositions exhibit lower impact values than the compositions containing 75 wt.% modified ABS, the improvement in impact properties and particularly in HDT values is significant (compare Examples 16-18 with Control C) even at an acrylamide level of 0.5 wt.%.

The property improvement afforded mixtures of polyamides and styrenic resins by acrylamide modification of the styrenic resin component extends to three-component mixtures comprising a polyamide and both an acrylamide-modified styrenic resin and a conventional, unmodified styrenic resin.

Examples 19-25.

In the following examples, three component resin mixtures comprising 25 wt.% nylon 6 and 75 wt.% of a mixture of conventional, unmodified ABS resin and the 10 wt.% acrylamide-modified ABS resin of Example 5 were prepared as before and tested. The formulations and physical properties of Examples 19-25, together with control examples, are summarized in Table IV.

It will be seen from a consideration of the physical property data for Example 9, 19-25 and Control E that substantial property improvement is realized, particularly in impact value, when as little as 5 wt.% of an acrylamide-modified ABS resin is incorporated into a blend of unmodified ABS resin and nylon 6 (compare Example 25 with Control E). Further replacement of unmodified ABS resin with acrylamide-modified ABS resin, up to 100% replacement, effects only slight further changes in impact properties, together with a modest change in rigidity (compare Example 9-24 with Control E).

Thus it is apparent that compositions having an improved and commercially attractive balance of physical properties may be obtained either by preparing alloys comprising polyamides and acrylamide-modified styrenic resins or by adding an acrylamide-modified styrenic resin to a blend of a polyamide and a conventional, unmodified styrenic resin. Although the optimum level of acrylamide-modification employed will depend in part upon the particular composition selected, in general the acrylamide content of the final alloy or blend will lie between 0.5 and 10 wt.%.

The use of acrylamide-modified styrenic resin to improve the properties of polyamide-styrenic resins blends is not limited to mixtures of nylon 6 and ABS and may be extended to blends of a variety of polyamides with other impact modified styrenic resins or with rigid, styrene-containing copolymers as well as mixtures thereof.

EXAMPLES 26-31

In the following examples blends of acrylamide-modified ABS resins and of acrylamide—modified styrene—acrylonitrile copolymer resins with polyamides were prepared as before and tested. The formulations and physical property data are summarized in Table V.

TABLE IV

| | Three-component Alloys of Nylon 6, ABS & Modified ABS Resins | | | | | | | | Control |
|---|---|---|---|---|---|---|---|---|---|
| Example No.: | 9 | 19 | 20 | 21 | 22 | 23 | 24 | 25 | E |
| Formulations: | | | | | | | | | |
| Modified ABS (pbw) (1) | 75 | 50 | 40 | 30 | 25 | 20 | 10 | 5 | 0 |
| Nylon 6 (pbw) | 25 | 25 | 25 | 25 | 25 | 25 | 25 | 25 | 25 |
| ABS (pbw) (2) | 0 | 25 | 35 | 45 | 50 | 55 | 65 | 70 | 75 |
| % Acrylamide (3) | 7.5 | 5 | 4 | 3 | 2.5 | 2 | 1 | 0.5 | 0 |
| Properties: | | | | | | | | | |
| Izod Impact (3) | 11.8 | 11.9 | 11.9 | 11.8 | 12.4 | 11.9 | — | 13.1 | 2.7 |
| | (11.5) | (10.2) | (11.6) | (11.9) | — | (11.0) | (13.4) | — | (2.2) |
| HDT (°F.) (3) | 218 | — | — | 216 | — | — | — | — | 216 |
| Yield (Kpsi) | 6.10 | 6.08 | 6.10 | 6.01 | 6.52 | 5.92 | 5.86 | 5.85 | 5.88 |
| Elong (%) | 70 | 67 | 46 | 50 | 80 | 53 | 88 | 81 | 84 |
| T. Mod (Kpsi) | 282 | 273 | 283 | 272 | 315 | 276 | 281 | 276 | 273 |

Notes:
(1) Acrylamide-modified ABS of Example 5. See Table I.
(2) Commercial unmodified ABS having 30% rubber content.
(3) See note 3, Table III.

TABLE V
Alloys of Acrylamide-modified Styrenic Resins with Polyamides

| Example No.: | 26 | 27 | 28 | 29 | 30 | 31 | Controls F | G | H | I |
|---|---|---|---|---|---|---|---|---|---|---|
| Formulations: | | | | | | | | | | |
| Modified Styrenic: (1) | | | | | | | | | | |
| Ex. 5 (pbw) | 75 | 50 | 50 | — | — | — | — | — | — | — |
| Ex. 1 (pbw) | — | — | — | — | — | — | 75 | — | — | — |
| Ex. 6 (pbw) | — | — | — | 75 | 50 | 25 | — | — | 100 | — |
| Ex. 7 (pbw) | — | — | — | — | — | — | — | — | — | 75 |
| Nylon 6 (pbw) | — | — | — | 25 | 25 | 25 | — | — | — | 25 |
| Nylon 6,6 (pbw) | 25 | 50 | 30 | — | — | — | 25 | 25 | — | — |
| ABS (pbw) (2) | — | — | 20 | — | 25 | 50 | — | 75 | — | — |
| % Acrylamide (3) | 7.5 | 5.0 | 5.0 | 7.5 | 5.0 | 2.5 | 0 | 0 | 10 | 0 |
| Properties: | | | | | | | | | | |
| Izod Impact (4) | | | | | | | | | | |
| Dry | 8.7 | 2.2 | 2.2 | 0.2 | 0.6 | 2.2 | 2.3 | 1.0 | 0.1 | * |
| Tempered | 10.2 | 3.1 | — | — | — | — | — | 1.7 | — | * |
| HDT (°F.) (4) | 213 | 208 | 214 | 222 | 222 | (214) | 203 | (209) | 217 | * |

Notes:
(1) Acryalamide-modified resins of Examples 1–7 see Table I.
(2) Commercial unmodified ABS having 30 wt. % rubber content.
(3) Wt. % acrylamide in total composition.
(4) See note 3, Table III.
*Molded samples delaminate; molded test bars could not be prepared or tested.

As reflected in the summary of test data for Examples 26–28 and Controls F and G, alloys comprising acrylamide-modified ABS and nylon 6,6 Examples 26 and 27, as well as three component alloy blends, Example 28, exhibit enhanced impact properties and HDT values when compared with blends of unmodified ABS with nylon 6,6. Similarly, an alloy of acrylamide—modified styrene—acrylonitrile copolymer (SAN) with nylon 6, Example 29, although quite brittle, was moldable to form specimens that could be tested. The control blend of unmodified SAN and nylon 6, Control I, could not be tested. Alloy blends of acrylamide-modified SAN, nylon 6 and ABS, Examples 30 and 31 exhibited good impact properties and HDT values.

EXAMPLE 32

Comparative Example

An acrylic acid-modified ABS graft polymer resin was prepared by the process of Example 2 by replacing acrylamide monomer with acrylic acid monomer to provide a latex emulsion of a graft polymer having 25 wt.% polybutadiene rubber substrate and a graft copolymer component comprising 46 wt.% styrene units, 28 wt.% acrylonitrile units and 1 wt.% acrylic acid units. The emulsion was congulated with aqueous calcium chloride, collected by filtration, washed well and dried.

A blend comprising 50 wt.% acrylic acid-modified ABS and 50 wt.% nylon 6 was prepared by powder blending and injection molding to form plaques. The blend was difficult to mold, giving rough surfaced parts and appeared to be cross-linked. Extrudates were also rough surfaced and exhibited severe melt fracture.

It will thus be apparent that although styrenic resins which have included therein a monomer such as acrylic acid capable of forming covalent bonds with the endgroups of the polyamide do form useful materials as taught by U.S. Pat. No. 3,485,777, the resulting compositions become intractable when comprised of a substantial proportion of the modified styrenic resin. By contrast, all of the compositions of the instant invention, as represented by Examples 9–31, are readily injection moldable and remain tractable over the range of 5 to 95 wt.% modified styrenic resin and correspondingly from 95 to 5 wt.% polyamide.

The instant invention will thus be seen to be an alloy comprising from 5 to 95 wt.% of a polyamide and from 95 to 5 wt.% of a modified styrenic resin, the modification being accomplished by including from 0.5 to 15 pbw, preferrably from about 0.5 to about 10 pbw (per hundred pbw modified styrenic resin) of a copolymerizable, ethylenically-unsaturated carbonamide, preferrably acrylamide, as a monomer in the preparation of the styrenic resin. The modified styrenic resins are thus selected from the group consisting of copolymers of styrene, acrylamide and one or more monomers copolymerizable therewith, and graft copolymers of styrene, acrylamide and one or more monomers copolymerizable therewith on a rubbery substrate. It will be apparent to those skilled in the art that many variations and modifications of the instant invention are possible, and that the alloy compositions of this invention may be further compounded with fillers, pigments, stabilizers, mineral and glass fibers, flame retardants, lubricants and the like. Such modifications do not depart from the scope of the invention which is defined solely by the appended claims.

We claim:

1. A polymer composition comprising from 5 to 95 wt.% of a polyamide and correspondingly from 95 to 5 wt% of a resin selected from the group consisting of copolymers consisting of a styrene, an acrylonitrile and an ethylenically-unsaturated carbonamide, and graft polymers thereof on a rubbery substrate polymer, said resin having incorporated therein from about 0.5 to about 15 parts by weight of said copolymerizable ethylenically-unsaturated carbonamide per hundred parts by weight resin.

2. The composition of claim 1 wherein said resin is selected from the group consisting of styrene-acrylamide-acrylonitrile copolymers and graft copolymers of styrene, acrylamide and acrylonitrile on a rubbery substrate.

3. The composition of claim 1 further comprising a styrenic resin.

4. A composition comprising from 5 to 95 wt% of a polyamide and correspondingly from 95 to 5 wt% of a mixture of a styrenic resin and (b) a resin selected from the group consisting of copolymers of a styrene, acrylamide and an acrylonitrile and graft polymers of a styrene, acrylamide and an acrylonitrile on a rubbery substrate, said resin having from 0.5 to 15 parts by weight of said acrylamide per hundred parts by weight of said resin.

5. The composition of claim 4 wherein said styrenic resin is selected from the group consisting of styrene-acrylonitrile copolymers (SAN), acrylonitrile-butadiene-styrene (ABS) resins and mixtures thereof.

6. The composition of claim 1 wherein said polymer composition comprises from 25 to 50 wt% of said polyamide and correspondingly from 75 to 50 wt% of said resin.

7. The composition of claim 4 wherein said composition comprises from 75 to 50 wt% of said polyamide and correspondingly from 75 to 50 wt% of said mixture.

* * * * *

UNITED STATES PATENT AND TRADEMARK OFFICE
CERTIFICATE OF CORRECTION

PATENT NO. : 4,496,690

DATED : January 29, 1985

INVENTOR(S) : Thomas S. Grant and Charles L. Myers

It is certified that error appears in the above—identified patent and that said Letters Patent is hereby corrected as shown below:

Column 12, line 8, cancel "75 to 50 wt%" and insert -- 25 to 50wt% --.

Signed and Sealed this

Twenty-fifth Day of June 1985

[SEAL]

Attest:

DONALD J. QUIGG

Attesting Officer

Acting Commissioner of Patents and Trademarks